(12) United States Patent
Jackson et al.

(10) Patent No.: US 8,046,678 B2
(45) Date of Patent: Oct. 25, 2011

(54) EMPLOYING PARTIAL EVALUATION TO PROVIDE A PAGE

(75) Inventors: David Jackson, San Mateo, CA (US);
Aamod Sane, Fremont, CA (US);
Ashish Kasi, Fremont, CA (US);
Chandra Pisupati, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1123 days.

(21) Appl. No.: 11/209,249

(22) Filed: Aug. 22, 2005

(65) Prior Publication Data
US 2007/0044016 A1  Feb. 22, 2007

(51) Int. Cl.
G06F 17/00 (2006.01)
G06F 3/00 (2006.01)
G06F 9/44 (2006.01)
G06F 9/45 (2006.01)

(52) U.S. Cl. ........ 715/234; 715/239; 715/760; 717/106; 717/110; 717/111; 717/136; 717/152; 717/153

(58) Field of Classification Search .......... 715/234, 715/236–239, 745–746, 760; 717/106, 110–116, 717/136, 152–153
See application file for complete search history.

(56) References Cited

U.S. PATENT DOCUMENTS

| | | | | |
|---|---|---|---|---|
| 6,035,119 A | * | 3/2000 | Massena et al. | 717/100 |
| 6,330,575 B1 | | 12/2001 | Moore et al. | |
| 6,484,149 B1 | | 11/2002 | Jammes et al. | |
| 6,625,803 B1 | * | 9/2003 | Massena et al. | 717/100 |
| 7,207,064 B2 | * | 4/2007 | Fee et al. | 726/14 |
| 2008/0034303 A1 | * | 2/2008 | Evans | 715/763 |

OTHER PUBLICATIONS

Lewis, R., 'Adobe Pagemill 2.0 Handbook, Hayden Books, 1996, pp. 137-156, 225-231.*
Naren Ramakrishnan, "PIPE: Web Personalization by Partial Evaluation", Nov.-Dec. 2000, IEEE Internet Computing, pp. 21-31.*
Predescu, Ovidiu "Advanced Control Flow, A different approach" (visited Mar. 31, 2005) <http://cocoon.apache.org/2.1/userdocs/flow/continuations.html>.
Predescu, Ovidiu "Apache Cocoon—Control Flow, Control Flow" (visited Mar. 31, 2005) <http://cocoon.apache.org/2.1/userdocs/flow/index.html>.
Predescu, Ovidiu "Advanced Control Flow, Using Cocoon's Control Flow" (visited Mar. 31, 2005) <http://cocoon.apache.org/2.1/userdocs/flow/using.html>.

(Continued)

Primary Examiner — Chau Nguyen
(74) Attorney, Agent, or Firm — Frommer Lawrence & Haug LLP; Matthew M. Gaffney

(57) ABSTRACT

A web page is generated by applying a partial evaluation technique. In one embodiment, at design time, a page designer enables a dynamic version of a page specification program to be generated, such as by way of a page customization interface. This dynamic version can be executed during the design process, with page customization choices evaluated in a dynamic manner. The parts of the page specification that can be evaluated to static form at design time are identified, and the program is partially evaluated, with the identified parts transformed to static form. The remaining dynamic parts of the page specification program are executed at request time, resulting in a generation of the page to be provided for display over the network. In general, different parts of a page specification program may be selected for evaluation at different times, and there may be more than two phases of evaluation.

17 Claims, 8 Drawing Sheets

OTHER PUBLICATIONS

Predescu, Ovidiu et al. "Advanced Control Flow" The Apache Software Foundation, pp. 1-17 (2005).

Predescu, Ovidiu et al., "Advanced Control Flow, Sitemap" (visited Mar. 31, 2005) <http://cocoon.apache.org/2.1/userdocs/flow/sitemap.html>.

The Apache Software Foundation "Advanced Control Flow, Tutorial: A Gentle Introduction to Cocoon Control Flow" (visited Mar. 31, 2005) <http://cocoon.apache.org/2.1/userdocs/flow/tutor.html>.

Predescu, Ovidiu "Advanced Control Flow, Cocoon and continuations" (visited Mar. 31, 2005) <http://cocoon.apache.org/2.1/userdocs/flow/how-does-it-work.html>.

Belapurkar, Abhijit "Use continuations to develop complex Web applications, A programming paradigm to simplify MVC for the Web" (visited Dec. 8, 2005) <http://www-128.ibm.com/developerworks/library/j-contin.html>.

* cited by examiner

EMPLOYING PARTIAL EVALUATION TO PROVIDE A PAGE

FIELD OF THE INVENTION

The present invention relates generally to generation of web pages, and more particularly, but not exclusively, to employing a partial evaluation technique to provide a web page.

BACKGROUND OF THE INVENTION

The process of providing a page, such as a web page, over a network can be regarded as having at least two distinct stages. In a first stage, which may be referred to as "design time," a designer specifies the layout and contents of the page and additionally may determine the interactive flow of a set of linked pages. In a subsequent stage, which may be referred to as "request time," a server provides the page over a network in response to a request from an end user, in accordance with a network protocol such as Hypertext Transfer Protocol (HTTP). Often, especially in the case of relatively complex and interactive web pages, the page is provided by evaluation of a server-side script or similar program to produce all or part of the page dynamically, such as a script written in PHP Hypertext Preprocessor (PHP). During both stages, users (page designers and end users) typically operate browser applications or the like to view the page. A page provided for display may be encoded as a document written in Hypertext Markup Language (HTML) or another page formatting or page description language, such as, for example, Wireless Markup Language (WML). At design time, the page designer may view a current version of the page that is in the process of being designed.

These two stages typically have very different usage patterns and scalability requirements. At design time, a relatively small number of page designers may be actively editing, previewing, testing, and revising the content of pages being developed for a site. It is generally desirable for such pages to be displayed to the designers in a manner that facilitates multiple iterations of experimentation and revision. The page design process may itself take place across a network; for example, possibly thousands of different designers of online store sites may interact with a provider that enables design of online store websites for hosting by the provider.

Request time, by contrast, may involve millions of network users viewing pages served by a limited number of servers over varying network traffic conditions. At request time it is important for pages to be displayed within acceptable time limits, particularly in the case of commercial sites where the end users are customers shopping over the network. For typical dynamically-generated web pages, response time is dependent in part on how efficiently a complex page can be assembled.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein.

DETAILED DESCRIPTION OF THE INVENTION

Figure 1:
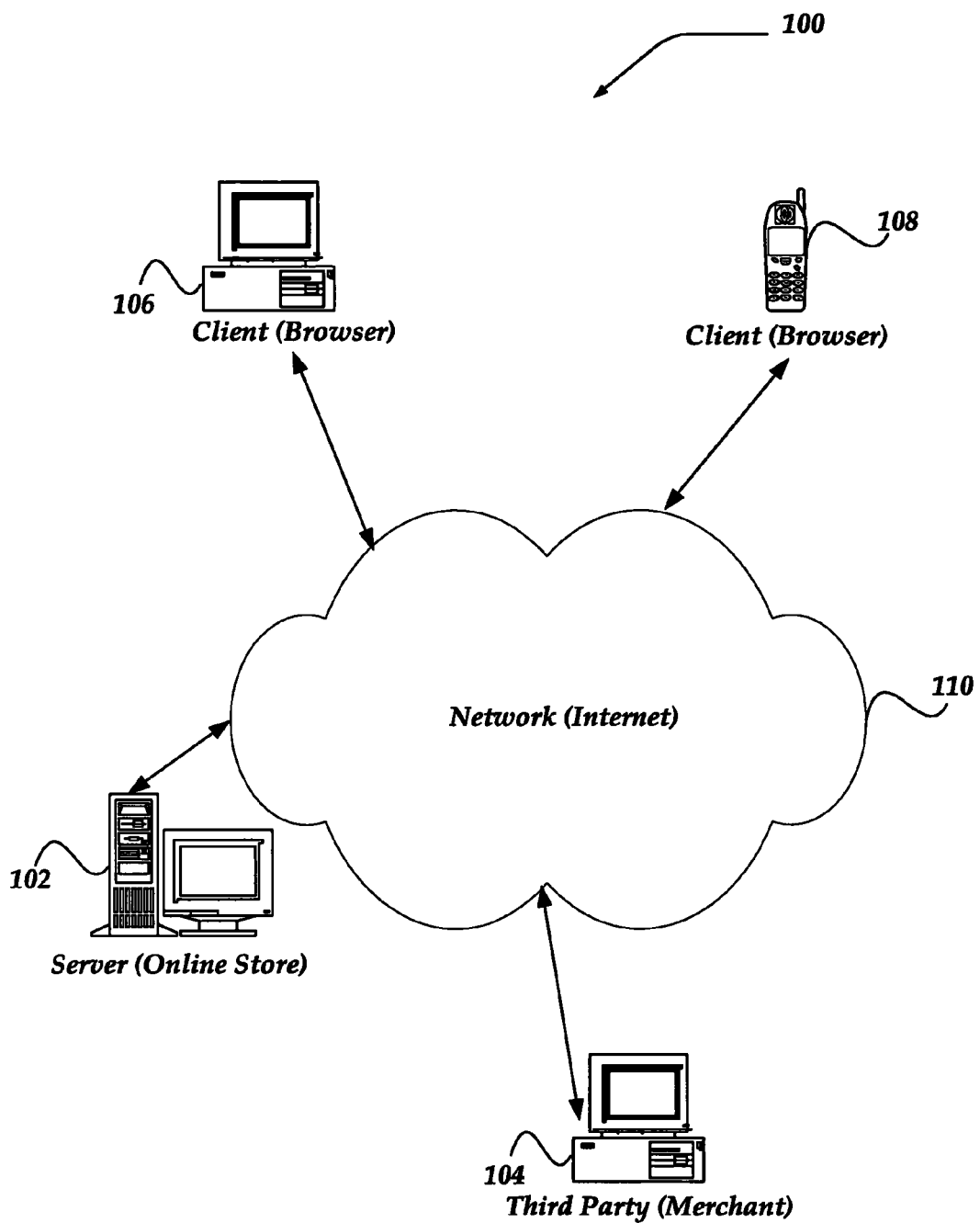
FIG. 1 is a functional block diagram illustrating one embodiment of an environment for practicing the invention.

The present invention will now be described more fully hereinafter with reference to the accompanying drawings, which form a part hereof, and which show, by way of illustration, specific exemplary embodiments by which the invention may be practiced. The invention may, however, be embodied in many different forms and should not be regarded as limited to the embodiments set forth herein. Rather, these embodiments are provided so that this disclosure will be thorough and complete and will convey fully the scope of the invention to those skilled in the art. The following detailed description is, therefore, not to be taken in a limiting sense.

The present invention enables a web page to be provided by employing a partial evaluation technique. In programming language theory, a partial evaluator takes a source program and a subset of the input of the source program ("static" input that is known at partial evaluation time) and produces a transformed version of the program, called a "residual program," that is specialized with respect to this input. When the residual program is run on the remaining input ("dynamic" input that is unknown at partial evaluation time), it gives the same result as running the source program on the entire input. Partial evaluation has generally been a subject confined to academic research on programming languages.

In accordance with the invention, at design time, a dynamic version of a page specification program, or the like, is generated. The version is "dynamic" in a relative sense: certain features of the page that are expressed dynamically in the page specification program are potentially resolvable to static form prior to request time, while other features are not resolvable until request time. The page specification program, which may take various forms (for example, a script written in PHP or another language) that will be referred to generally as a "program" herein, provides a description of one or more pages. The dynamic version may be based in part on customization inputs or customization choices provided by a page designer interacting by way of a page design customization interface. Customization choices may include, for example, page appearance specifications, choices of simple and composite displayable page components, choices of single-page or multiple-page presentation of content, and the like. A composite page component may, for example, be one that combines textual, graphical, and formatting data, such as a coupon or certificate for display in a checkout page for an online store.

The dynamic version of the page specification program may be executed during the design process, with page customization choices effectively evaluated in a dynamic manner. The parts or components of the page specification that can be statically determined at design time, following the designer's customizations, are identified. The program is then partially evaluated, resulting in a version of the program in which the identified parts are transformed into static form. The remaining dynamic parts of the page specification program are executed at request time, resulting in a generation of a final evaluated version of the page to be provided for display over the network to an end user.

In one embodiment, insertion of tags or another technique may be employed to identify the statically-determinable elements of the code of the page specification program. This code may then be converted to two forms. In one form, the tags are ignored, and the code is executed at design time. In another form, the tagged parts of the code are removed, and the non-design parts are converted to a form that outputs the source code rather than executing it, such as by converting it to strings within print statements. The result is executed, producing a transformed version of the page specification program for further evaluation and display at request time. The invention includes other embodiments, however.

The invention enables appropriate uses of both the dynamic version and the partially evaluated version of the page specification program. In one embodiment, the invention may be employed to manage the different scalability requirements of design time and request time. Although some embodiments of the invention are applicable to a two-stage transformation of a page specification program at design time and request time, the invention is not so limited. Rather, the invention generally enables different parts of the page specification program to be selected for evaluation at different times, and there may be more than two phases of evaluation. The invention may be employed to provide pages for interactive sites, such as an online store or other electronic commerce sites, as well as other kinds of pages.

A page designed, generated, and provided for display over a network in accordance with the invention may include a web page encoded as a document written in HTML or another page formatting or page description language, such as Wireless Markup Language (WML). A page may be provided over a network by a server to a client in accordance with a network protocol such as Hypertext Transfer Protocol (HTTP) and may be provided in accordance with a security protocol such as Secure Sockets Layer (SSL). For example, a page in the checkout processing phase of an online shopping experience may be provided using HTTPS, which is HTTP over an SSL-secured connection. The display may occur by way of a browser application or another application. As noted, a script or executable program, such as a PHP script, may be used in generating the page, dynamically or otherwise, in one or more phases of the page generation process. Accordingly, references in this specification and the accompanying claims to a "page" may include one or more scripts or programs that are employed to generate a displayable one or more pages.

Illustrative Operating Environment

FIG. 1 illustrates one embodiment of an environment in which the present invention may operate. Not all of these components may be required to practice the invention, and variations in the arrangement and type of the components may be made without departing from the spirit or scope of the invention. The illustrated environment includes one suitable for use as a system for designing and deploying pages for online shopping, including the operator of an online store associated with a third-party merchant. However, the invention is also applicable to other environments, including environments in which a merchant independently designs and operates an online store, as well as environments not involving online shopping services or other forms of electronic commerce, such as interactive and/or informational websites.

As illustrated in FIG. 1, system 100 includes computing devices 102-108 coupled to and capable of communicating with one another across network 110. Computing devices 102-108 include server 102 used in operating an online store, a computing device operated by a third party 04 with respect to the operator of the online store, such as a third-party merchant, and clients 106-108 configured to run browser applications. Clients 106-108 include, for example, personal computer 106 running a web browser application, and web-enabled mobile device 108. Server 102 runs a web server application and related applications, such as an engine for dynamically generating HTML pages in accordance with scripts written in a language such as PHP and/or an application for controlling the navigation flow of pages served by server 102. Typically, server 102 is coupled to other devices that perform related or specialized tasks and that may also be coupled to network 110. For example, server 102, or an additional server device (not shown) linked to network 110 and, in some embodiments, coupled to server 102, may provide an interface for third party 104 for customizing the appearance and page navigation flow for one or more pages to be used for an online store or the like. In such a case, third party 104 may operate as a client with respect to server 102 or the additional server device.

Computing devices 102-108 may each include virtually any device that is configured to perform computation and that is capable of sending and receiving data communications by way of one or more wired and/or wireless communication interfaces. Devices 102-108 may be configured to communicate using any of a variety of network protocols. For example, server 102 may be configured to execute a web server application that employs a protocol such as HTTP or HTTPS to communicate information, such as a web page, across network 110 to client 106. Client 106 is configured to execute a browser application that employs HTTP or HTTPS to request information from server 102 and then displays the retrieved information to a shopper. The browser application may also be used to communicate data to server 102. Computing devices 102-108 may generally include server computers, personal computers, desktop computers, handheld computers, mobile devices, workstations, computers configured as client devices, personal digital assistants, programmable consumer electronics, wireless devices, and the like.

Network 110 is configured to couple one computing device to another computing device to enable them to communicate data. Network 110 is enabled to employ any form of computer-readable media for communicating information from one electronic device to another. Network 110 may include one or more of a wireless network, a wired network, a local area network (LAN), a wide area network (WAN), a direct connection such as through a Universal Serial Bus (USB) port, and the like, and may include the set of interconnected networks that make up the Internet. On an interconnected set of LANs, including those based on differing protocols, a router acts as a link between LANs, enabling messages to be sent from one to another. Communication links within LANs typically include twisted wire pair or coaxial cable. Communication links between networks may generally utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Remote computers and other electronic devices may be remotely connected to LANs or WANs by way of a modem and temporary telephone link. In essence, network 110 may include any communication method by which information may travel between computing devices.

The media used to transmit information across communication links as described above illustrate one type of machine-readable media, namely communication media. Generally, machine-readable media include any media that can be accessed by a computing device, including processor-readable media. Processor-readable media may include data storage media, network communication media, and the like. Moreover, communication media typically embody information comprising processor-readable instructions, data structures, program components, or other data in a modulated data signal such as a carrier wave or other transport mechanism, and such media may include any information delivery media. The terms "modulated data signal" and "carrier wave signal" include a signal that has one or more of its characteristics set or changed in such a manner as to encode information, instructions, data, and the like, in the signal. By way of example, communication media include wired media such as twisted pair, coaxial cable, fiber optic cable, and other wired media, and wireless media such as acoustic, RF, infrared, and other wireless media.

Illustrative Computing Device

Figure 2:
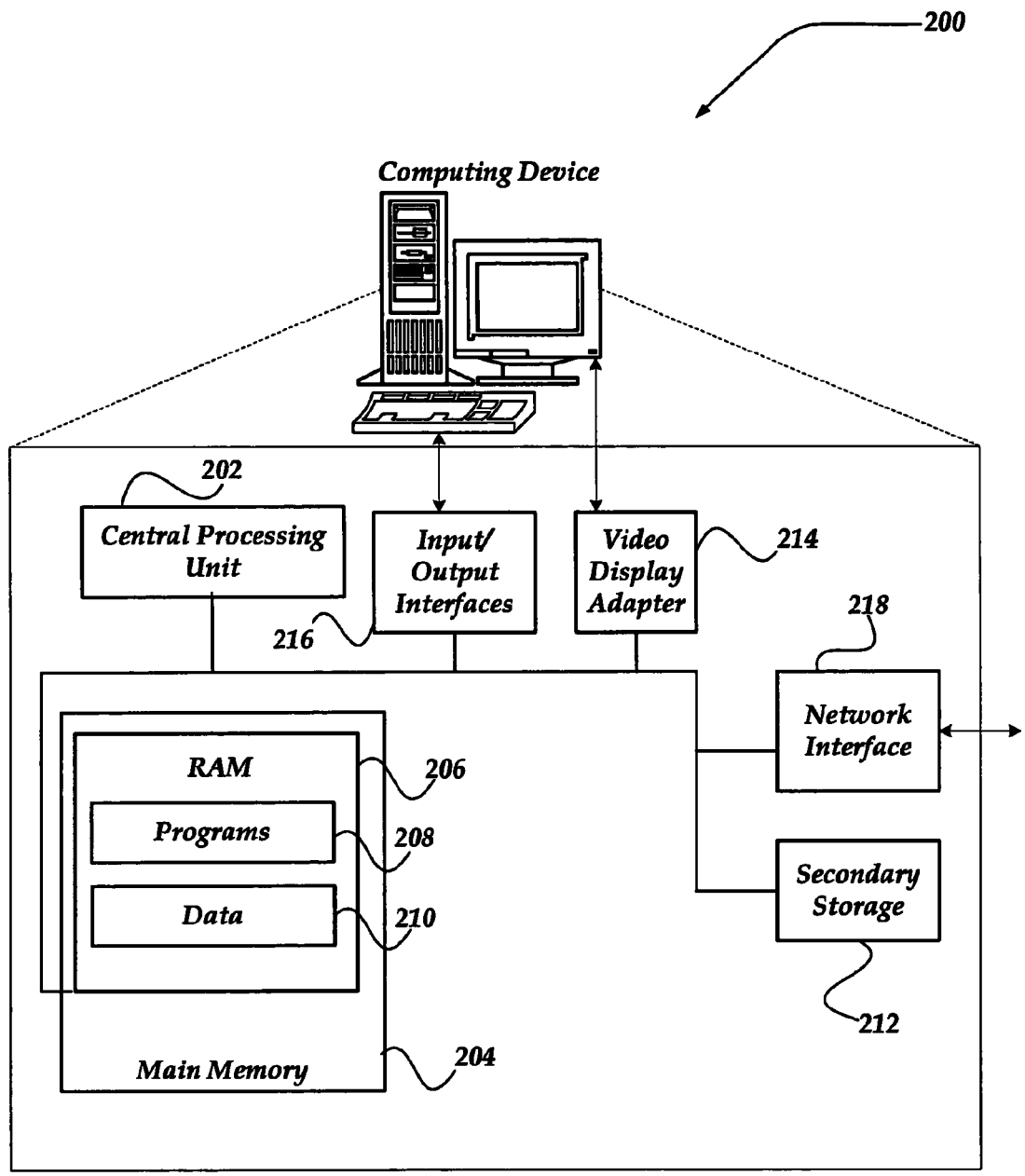
FIG. 2 illustrates one embodiment of a computing device that may be employed for various purposes in a system implementing the invention.

FIG. 2 shows one embodiment of a computing device 200 suitable for use as a client device, a server device, or another kind of computing device functioning other than as a client or server, such as, for example, clients 106-108, server 102, and third party-operated computing device 104 of FIG. 1, in a system implementing aspects of the invention. Device 200 may include many more or fewer components than those shown in FIG. 2 and components different from those shown in FIG. 2, as for example if device 200 represents a mobile device such as client 108. However, the components shown are sufficient to disclose an illustrative embodiment for practicing the present invention. The details of such devices are rudimentary to those having skill in the art and need not be described at length here.

As shown in FIG. 2, device 200 includes a central processing unit 202 in communication with a main memory 204. Main memory 204 may include RAM 206, ROM (not shown), and other storage means. Device 200 also typically includes at least one secondary storage device 212 such as a magnetic disk, an optical disk, and the like, for nonvolatile storage. Main memory 204 and secondary storage device 212 illustrate another example of processor-readable media for storage of information such as processor-executable code, data structures, program components, and other data.

Device 200 further includes a video display adapter 214 for communication with a display, and other input/output interfaces 216 for communicating with other peripheral input/output devices, such as a mouse, keyboard, or other such devices. Device 200 also includes network interface 218. By way of network interface 218, device 200 may be coupled to one or more networks, such as network 110 of FIG. 1. Network interface 218 is configured for use in accordance with one or more network protocols and technologies including, but not limited to, the TCP/IP protocol suite and various protocols conceptually residing below and above the TCP/IP protocol suite.

Main memory 204 is suitable for use in storing processor-executable programs 208 and processor-readable data 210. For example, main memory 204 may store data packets that are formatted in accordance with one or more network protocols and that are sent to or received from another computing device by way of network interface 218, and main memory 204 may store data comprising the data contents of a web page encoded in HTML. Main memory 204 stores programs 208 which include processor-executable instructions. Such programs include an operating system, programs that enable network communication by way of network interface 218, programs associated with a web server or a web client, programs that visually render web pages, such as a web browser client application or an application providing an interface for customizing the design of web pages, programs that execute or interpret scripts used in rendering interactive web pages, and the like.

Customization Architecture

Figure 3:
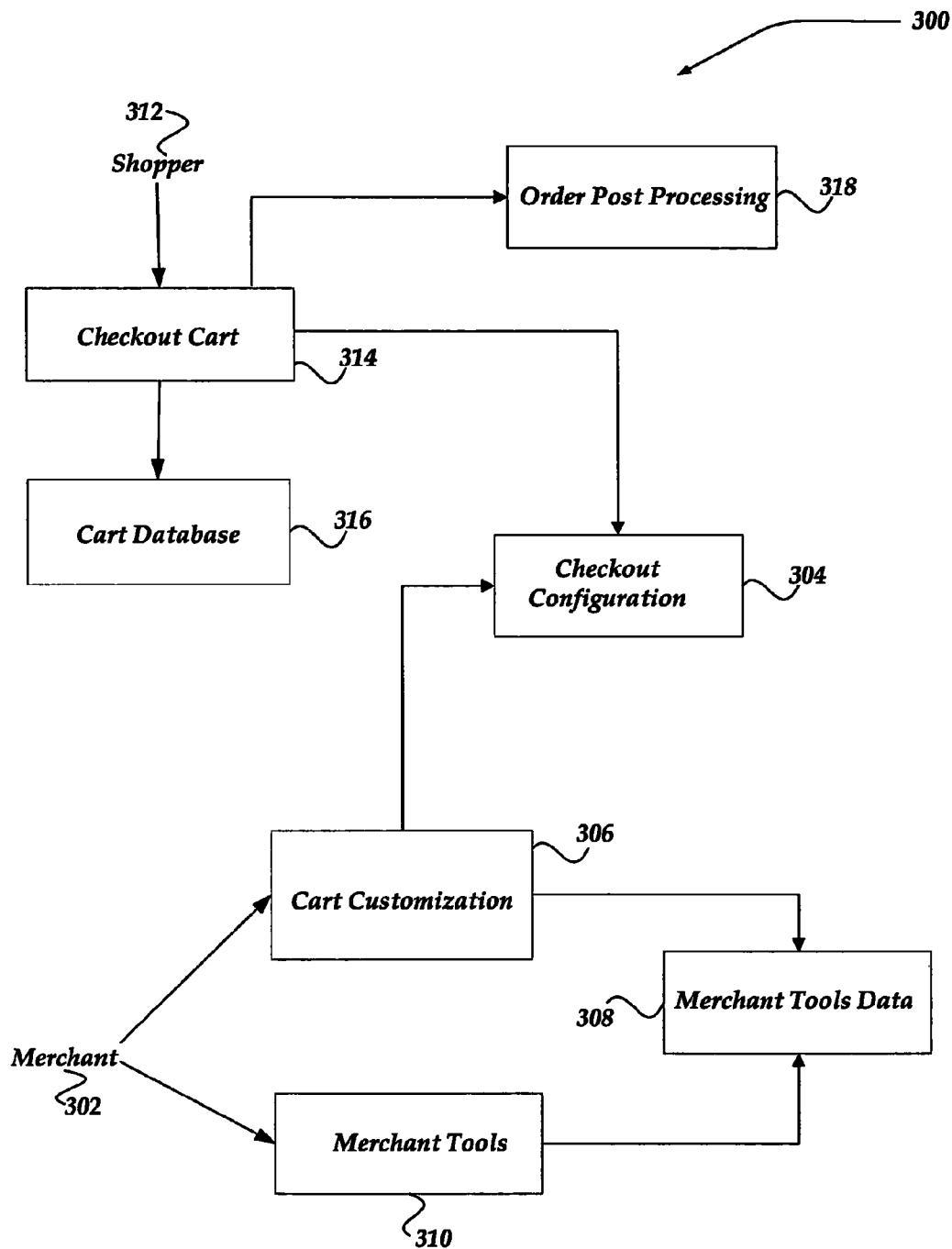
FIG. 3 is a block diagram illustrating elements of an architecture for modification of the presentation of a shopping cart and checkout pages of an online store.

FIG. 3 is a block diagram illustrating elements of an architecture 300 for modification of the presentation and layout of the shopping cart and checkout pages of an online store, as experienced by an online shopper. The modification may be initiated by a third-party merchant operating independently of the entity hosting and operating the online store. The modification may include customization of page appearance and content, page navigation flow, and other kinds of customization. It should be noted that the present invention also encompasses other embodiments, such as embodiments in which a merchant is also the host or operator of the online store site, and embodiments that include non-commercial interactive and/or informational website applications. Some simple examples of the customizations of page appearance that may be performed in the online store checkout context include: shipping and billing address layout (e.g., horizontally or vertically tiled on one page, or presented on two pages); customized headers and footers (for example, for branding purposes); adding custom fields to various page sections, such as fields relating to shipping and billing processing; specifying the order of particular fields within a page; choosing particular features such as gift certificates and coupons; and choosing the presentation of forms, such as the use of radio buttons instead of drop-down menus.

Architecture 300 illustrates, among other elements, the interfaces provided to third-party merchant 302 at design time in which page and page flow customization are initiated, and to online shopper 312 at request time in which the modified presentation of pages are provided in accordance with the customized page flow. Merchant 302 interacts with a set of provided customization and configuration tools, including cart customization tools 306 which are specifically for shopping cart and checkout page customization, and other merchant tools 310 which are used to configure and specify other aspects of the online store. Data relating to modifications performed by merchant 302 is stored in merchant tools data 308. Cart customization tools 306 are used for generating checkout configuration data 304.

Shopper 312 interacts by way of checkout cart 314, which includes an interface and associated components for presenting checkout pages and shopping cart data to shopper 312. A shopping cart may be displayed while shopper 312 is browsing items for potential purchase and prior to or following initiation of checkout processing. Checkout cart 314 uses data stored in cart database 316. Checkout cart 314 also employs checkout configuration data 304 which is generated by merchant 302 using cart customization tools 306. Data associated with checkout cart 314 is used by order post processing component 318 when checkout processing is initiated.

Figure 4:
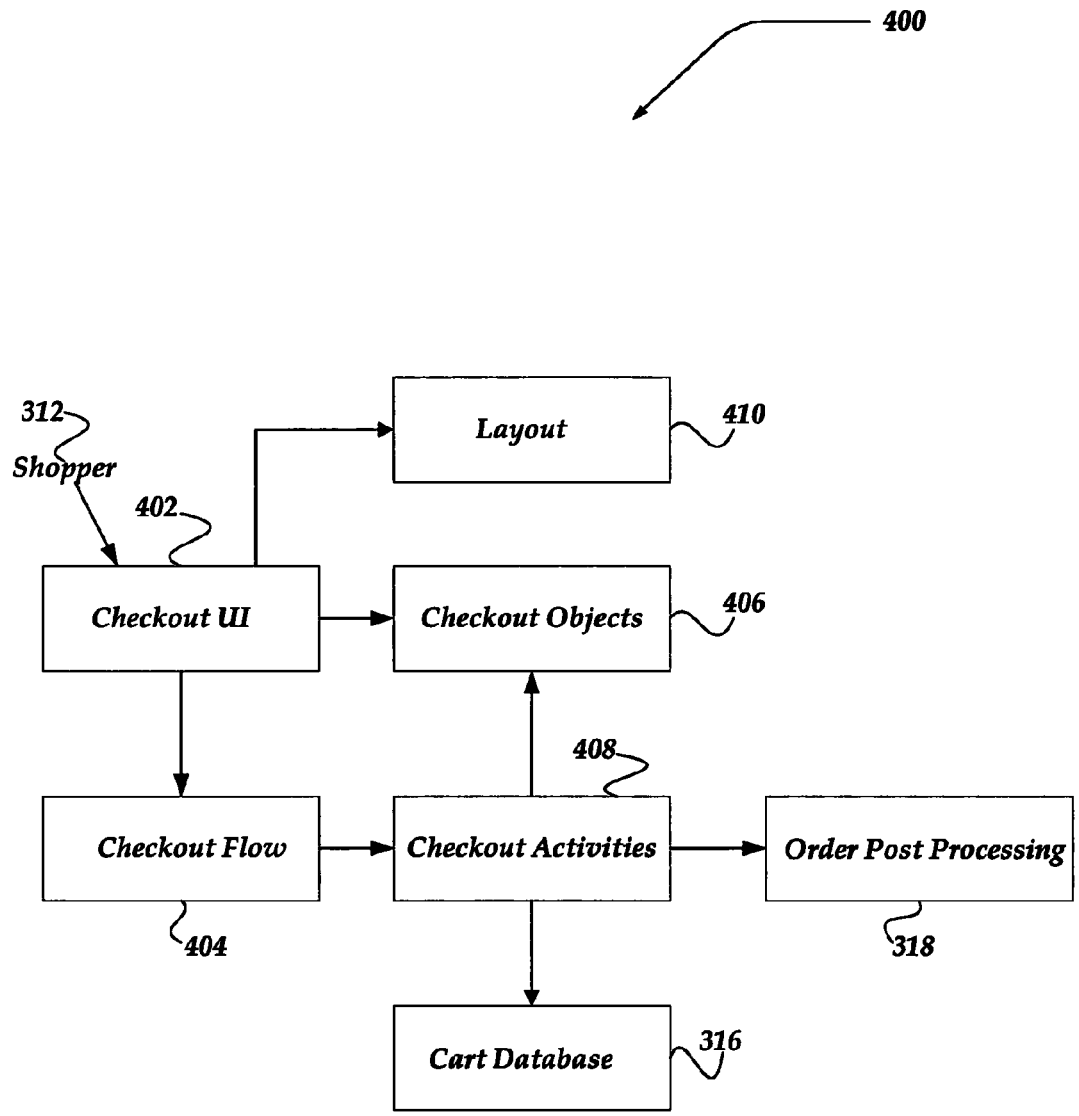
FIG. 4 is a block diagram illustrating in further detail elements of the architecture generally illustrated in FIG. 3, including interfaces and components associated with a customized checkout cart.

FIG. 4 is a block diagram illustrating in further detail elements of the architecture shown in FIG. 3, including the interfaces and components associated with customized checkout cart 314. As expanded in FIG. 4, checkout cart interface 314 includes checkout user interface (checkout UI) 402, checkout flow 404, checkout objects 406, layout 410, and checkout activities 408. Checkout UI 402 includes the interface presented to shopper 312. The presentation of checkout UI 402 is modified using one or more sets of configuration tools. Layout 410 for pages may be generated for display using partial evaluation, in accordance with the present invention.

Checkout UI 402 uses one or more presentation layouts 410 generated based on customizations by the merchant using the tools illustrated in FIG. 3. Specification programs for pages associated with layouts 410 are generated using a partial evaluation technique, as described further above and below. Checkout UI 402 also employs checkout flow component 404 for controlling page navigation flow for interaction by shopper 312. Checkout objects 406 include objects that are used in checkout processing to implement functional aspects of checkout, as by representing items for purchase, shopping carts, coupons, gift certificates, and the like. Checkout objects 406 include data as well as behavior defined by methods for marshalling, storing, and logging data. Checkout activities 408 include activities employing checkout objects 406 and associated with interactions with external payment and shipping providers, order posting as handled by order post processing component 318, and other activities such as taxation and shipping calculations. Checkout activities include communication with cart database 316.

Figure 5:
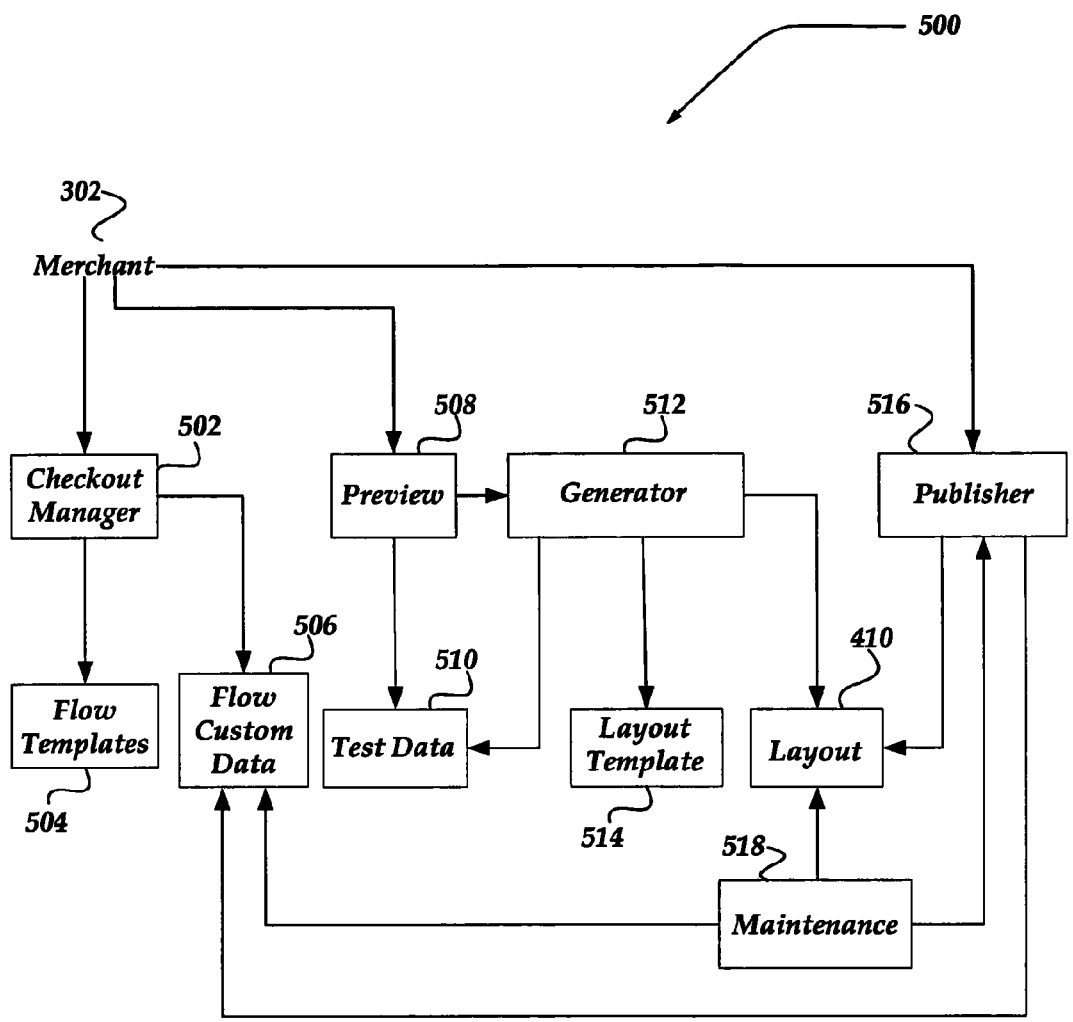
FIG. 5 is a block diagram illustrating in further detail elements of the architecture shown in FIG. 3, including the interfaces and components associated with cart customization tools.

FIG. 5 is a block diagram illustrating in further detail elements of the architecture shown in FIG. 3, including the interfaces and components associated with cart customization tools 306. Merchant 302 interacts with checkout manager 502, which is the interface to the modification and customization system made available to merchant 302. Using particular modification tools, merchant 302 employs checkout manager 502 to customize the presentation of checkout flows and other features of checkout. For example, merchant 302 may use checkout manager 502 to add custom fields to various forms, to change the look and feel of checkout pages, and so forth. Checkout manager 502 reads data in flow templates 504 and default values contained in flow custom data 506 and combines this data with data selected or provided by merchant 302 for customization of page appearance and page flow. Checkout manager 502 thereby generates merchant-specific customizations stored in flow custom data 506.

Merchant 302 also interacts with preview engine 508. Preview engine 508 uses generated flow custom data 506, which is treated as "working" data for specifying page appearance while customization is still in progress. Preview engine 508 combines flow custom data 506 with test data 510, which is used to simulate interaction by a shopper. Test data 510 includes sample item data representing intended purchases by a shopper. Preview engine 508 uses the combined data to present a preview of cart and checkout pages to merchant 302. If merchant 302 completes the previewing and testing process, preview engine 508 invokes generator 512 to generate versions of page layouts 410. Layout templates 514 reflect the presentation alternatives and features chosen by merchant 302, as well as alternatives that apply depending on shopper data. Generator 512 combines layout templates 514 with modifications specified by merchant 302 to produce layouts 410. As described further above and below, generator 512 performs partial evaluation of statically-determinable parts of pages. The statically-determinable elements may be identified by generator 512 or by another component, using a tagging technique or another technique. Partially-evaluated layouts 410 may then be made available by publisher 516 for delivery to shoppers or other network users. Publishing by way of publisher 516 may be initiated by merchant 302. Merchant 302 is able to revert from a working version to the published version of customized checkout and shopping cart-related pages.

Maintenance component 518 is employed for fixing errors and adding changes to merchant-generated layouts 410. Maintenance component 518 interacts with publisher 516 for publishing pages in bulk across multiple stores.

Generalized Operation

Figure 6:
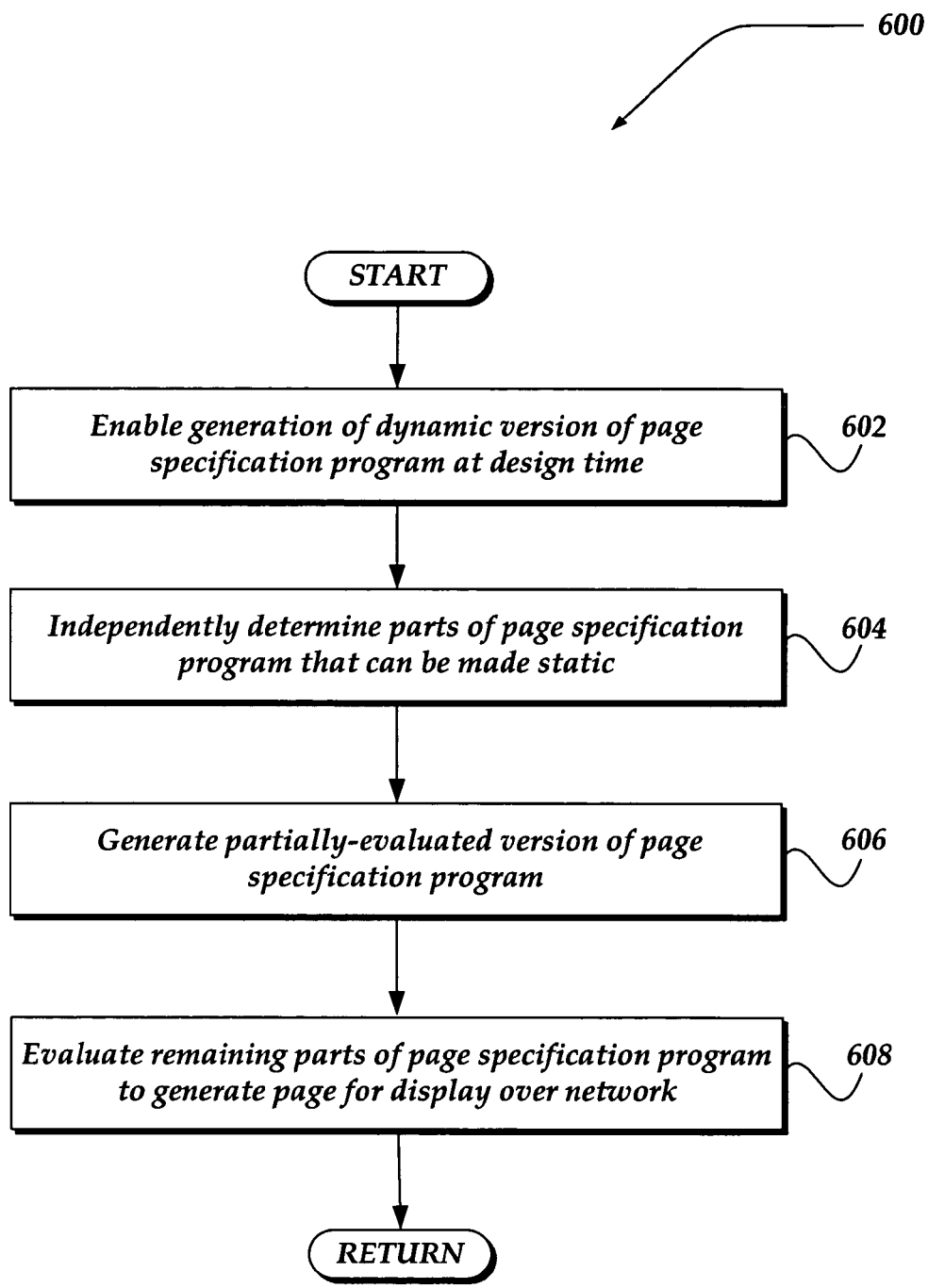
FIG. 6 illustrates a logical flow diagram generally showing one embodiment of a process for generating a page for display over a network using partial evaluation.

The operation of certain aspects of the invention will now be described with respect to FIGS. 6-8. FIG. 6 illustrates a logical flow diagram generally showing one embodiment of a process for generating a page for display over a network using partial evaluation. Following a start block, process 600 advances to block 602, at which a generation of a dynamic version of a page specification program at design time is enabled. At block 604, which may occur before or after block 602 in time, a determination is made of the parts of the page specification program that can be made static at the conclusion of design time (and prior to request time). Block 604 in general occurs independently of block 602, and may occur by way of an automated process.

Process 600 next flows to block 606, at which a transformed, partially-evaluated version of the page specification program is generated. Processing then advances to block 608, at which the remaining dynamic elements of the page specification program are evaluated to generate a final version of a page for display over a network. Process 600 then returns to a calling process to perform other actions.

Figure 7:
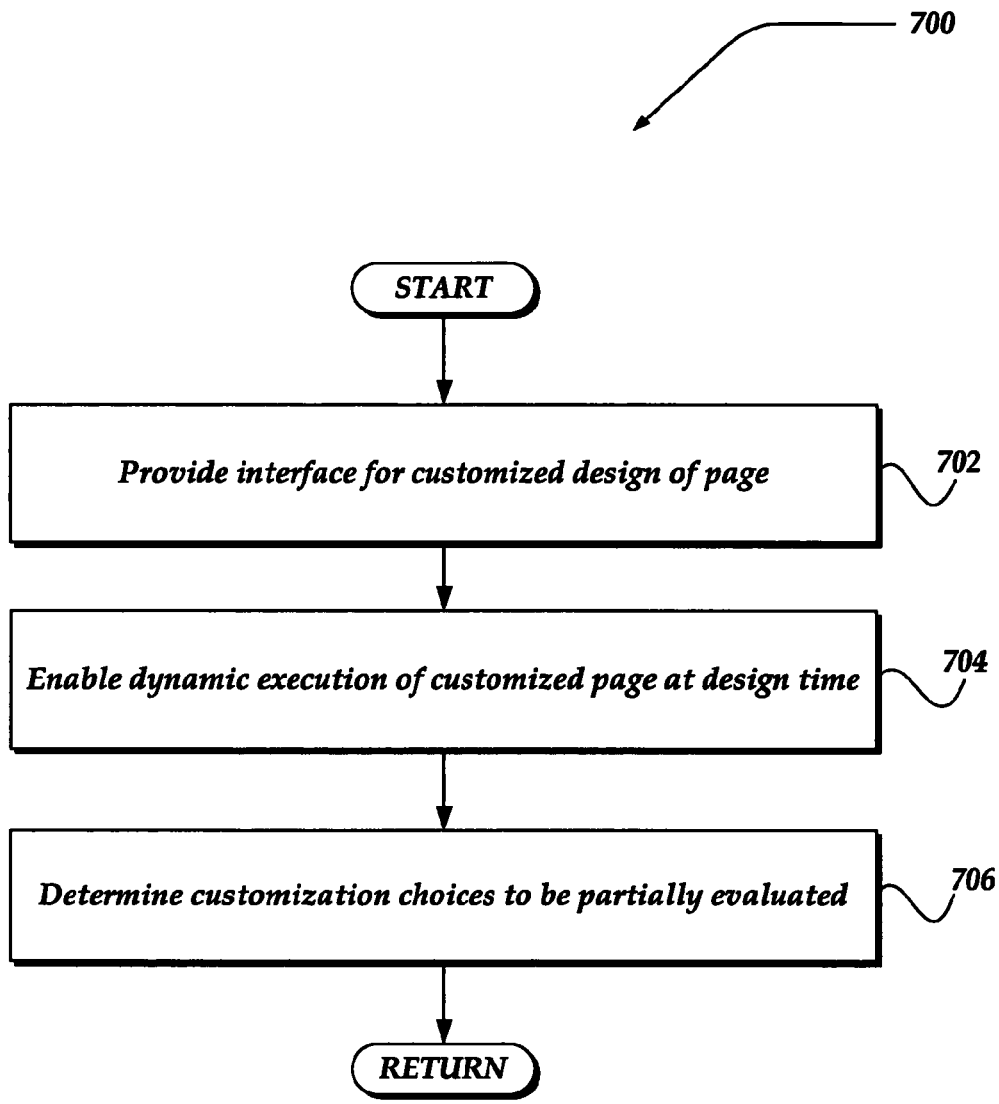
FIG. 7 illustrates a logical flow diagram generally showing one embodiment of a process for determining page customization choices to be partially evaluated.

FIG. 7 illustrates a logical flow diagram generally showing one embodiment of a process for determining page customization choices to be partially evaluated. Following a start block, process 700 flows to block 702, at which an interface is provided for customized design of a page, such as a shopping cart checkout page for an online store site. Processing then steps to block 704, where dynamic execution of a page specification program, incorporating the customized design, is enabled. Next, at block 706, a determination is made of the customization choices, as embodied in the page specification program, that can be partially evaluated to static form at design time. Process 700 then returns to a calling process to perform other actions.

Figure 8:
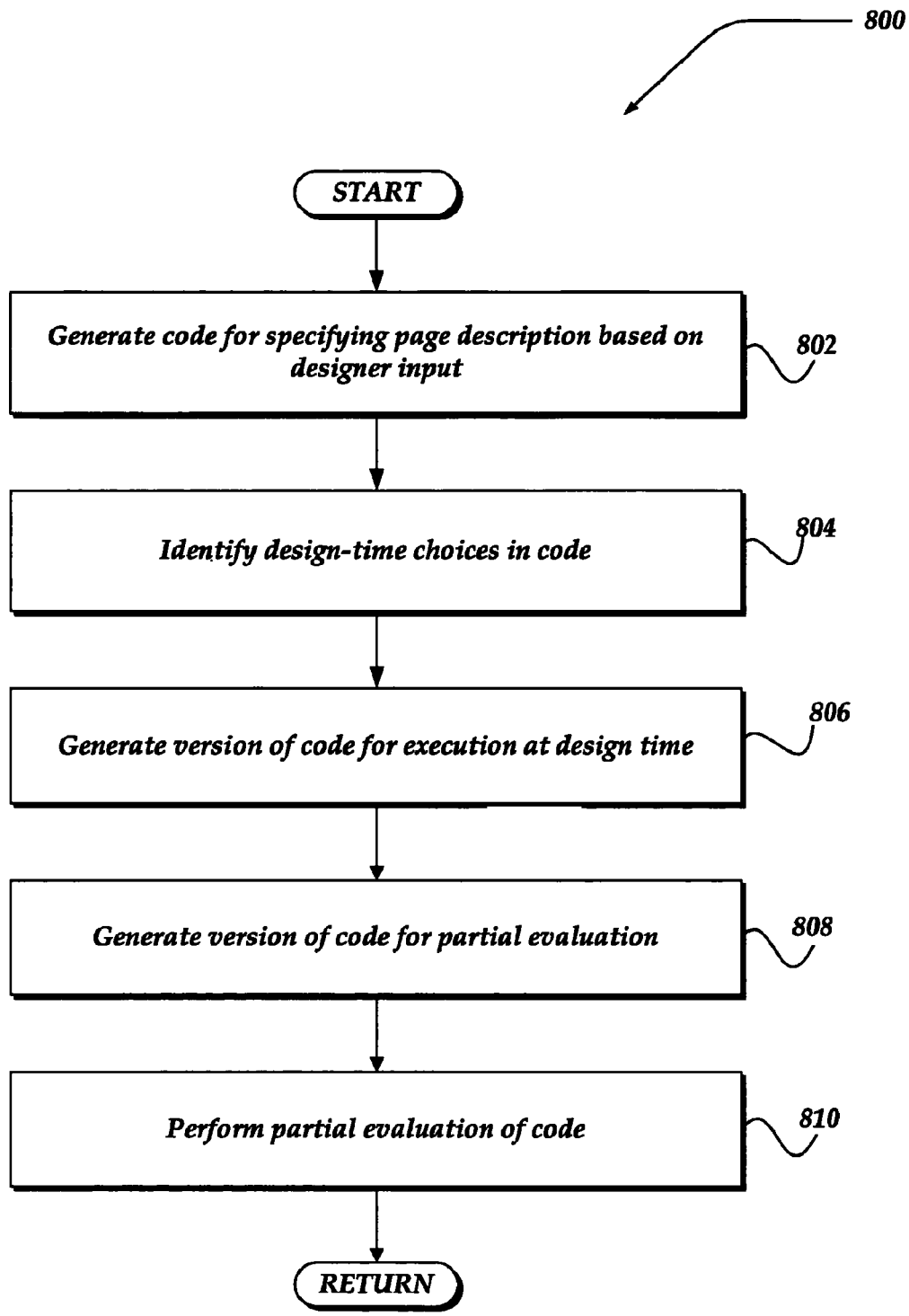
FIG. 8 illustrates a logical flow diagram generally showing one embodiment of a process for generating versions of code for specifying a page description, in accordance with the invention.

FIG. 8 illustrates a logical flow diagram generally showing one embodiment of a process for generating versions of code for specifying a page description. Following a start block, process 800 advances to block 802, at which code is generated that specifies a page description, based on inputs provided by the designer, such as customization choices made by way of a page design interface. Processing then flows to block 804, where the code is examined to identify design-time choices that may be statically resolved when design is completed. Block 804 may be performed by way of an automated procedure. Process 800 then steps to block 806, at which a version of the code for execution at design time is generated. This version may be used to display a preliminary or final version of a customized page to the page designer. Processing advances to block 808, at which a second version of the code is generated, which will be subjected to partial evaluation of the identified statically-determinable choices or other elements. Next, at block 810, partial evaluation of the second version of the code is performed, producing a page specification in which some elements remain dynamic, to be evaluated at request time, and some elements have been converted to static form. Process 800 then returns to a calling process to perform other actions.

EXAMPLE

Shipping Address/Billing Address Customization

The following simplified example illustrates aspects of some embodiments of the present invention. A page designer of checkout cart pages for an online store site may be provided, by way of a page customization or page design interface, various options for the display of a customer's shipping address and billing address. A first option may be to show the shipping address and billing address tiled horizontally on a page. A second option may be to tile the shipping address and billing address vertically. A third option may be to present the shipping address and billing address on separate pages. The page designer selects one of the available customization options by way of the interface (for example, by selecting an appropriate radio button or the like).

Corresponding to the customization choices made available through the page design interface is code for the underlying page specification program. Within this program, the customization choice for presentation of shipping and billing addresses might be expressed as follows, using a highly simplified language for illustrative purposes:

```
if (shipping billing horizontal)
    emit shipping; emit billing
else if (shipping billing vertical)
    emit shipping; linebreak; emit billing
else
    emit shipping; pagebreak; emit billing
```

The conditions in this code may be executed dynamically at design time based on the choice made by the designer by way of the interface. For example, the page designer may select the first option, for horizontal tiling of shipping and billing addresses. The if statement in the code is executed accordingly. It may be noted that once the choice is made by the designer, only one of the three choices originally available at design time is relevant at the request time stage. This provides one opportunity for partial evaluation and transformation to static form.

In one embodiment, a tagging technique may be employed to identify choices embodied in the code that may be evaluated at design time, producing the following tagged code:

```
<design>
    if (shipping billing horizontal)
</design>
    emit shipping; emit billing
<design>
    else if (shipping billing vertical)
</design>
    emit shipping; linebreak; emit billing
<design>
    else
</design>
    emit shipping; pagebreak; emit billing
```

In other embodiments, means other than tagging may be employed to differentiate design-time statically-determinable choices from elements that include dynamic aspects that are resolved at request time (for example, the address data itself is dynamic in the sense that it is known at request time but it is not known at design time).

The tagged code may then be converted into two forms. In a first form, the <design> tags are ignored, and the resulting version of the code may then be executed. This version is dynamic in the sense that it may contain elements that can be statically determined prior to request time, but static determination has not yet occurred. In the second form, the <design> tags are stripped, and the non-design parts are converted to a form that outputs the source code rather than executing it, for example, by converting it to strings within print statements. The second form of the code is executed, producing the following code:

```
if (shipping billing horizontal)
    print "emit shipping; emit billing"
else if (shipping billing vertical)
    print "emit shipping; linebreak; emit billing"
else
    print "emit shipping; pagebreak; emit billing"
```

This transformed code may then be executed based on the option chosen by the page designer. The result is the following partially-evaluated version of the code that is available for execution at request time:

emit shipping; emit billing

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing a page for display over a network at a request time, comprising:
   providing an interface enabling a page designer, during a design time, to customize the page, wherein the page is generated by executing a page specification program;
   determining, during the design time, a first part of the page specification program capable of being evaluated to a static form based on the customization and a second part of the page specification program to be evaluated at the request time;
   generating, during the design time, a modified version of the page specification program by converting the second part of the page specification program to a form that, when executed, outputs a source code representation of the second part of the page specification program;
   generating, during the design time, a partially evaluated page specification program by executing the modified version of the page specification program, wherein executing the modified version of the page specification program executes the first part of the page specification program and outputs the source code representation of the second part of the page specification program; and
   enabling, at the request time, a display of the page to a plurality of different users by executing the partially evaluated page specification program.

2. The method of claim 1, further comprising identifying the first part of the page specification program capable of being evaluated to a static form with a tagging technique.

3. The method of claim 1, wherein the page is at least one of a checkout page, a page associated with an online store, or a page that displays a virtual shopping cart.

4. The method of claim 1, wherein the interface is provided to a third-party entity.

5. The Method of claim 1, wherein the method is at least partially operative with a mobile device, a client, a server, or a wired computing device.

6. A server for providing a page for display over a network at a request time, comprising:
a network interface for communicating with a remote device that requests access to a page design interface for specifying a design of the page;
a processor in communication with the network interface; and
a memory in communication with the processor and for use in storing data and instructions that enable the processor to perform actions, including:
providing the page design interface enabling a page designer, during a design time, to customize the page, wherein the page is generated by executing a page specification program;
determining, during the design time, a first part of the page specification program capable of being evaluated to a static form based on the customization and a second part of the page specification program to be evaluated at the request time;
generating, during the design time, a modified version of the page specification program by converting the second part of the page specification program to a form that, when executed, outputs a source code representation of the second part of the page specification program;
generating, during the design time, a partially evaluated page specification program by executing the modified version of the page specification program, wherein executing the modified version of the page specification program executes the first part of the page specification program and outputs the source code representation of the second part of the page specification program; and
enabling, at the request time, a display of the page to a plurality of different users by executing the partially evaluated page specification program.

7. The server of claim 6, further comprising identifying the first part of the page specification program capable of being evaluated to a static form with a tagging technique.

8. The server of claim 6, wherein the page is at least one of a checkout page, a page associated with an online store, or a page that displays a virtual shopping cart.

9. The server of claim 6, wherein the interface is provided to a third-party entity.

10. The Server of claim 6, wherein the remote device is at least one of a mobile device, wired computing device, or a client.

11. A client for enabling a page to be provided for display over a network at a request time, comprising:
a memory for use in storing data and instructions; and
a processor in communication with the memory and for enabling actions based on the stored instructions, including:
requesting access to an interface for specifying, during a design time, a customization to the page, wherein the page is generated by executing a page specification program;
enabling, during the design time, a determination of a first part of the page specification program capable of being evaluated to a static form based on the customization and a second part of the page specification program to be evaluated at the request time;
enabling, during the design time, a generation of a modified version of the page specification program by converting the second part of the page specification program to a form that, when executed, outputs a source code representation of the second part of the page specification program;
enabling, during the design time, a generation of a partially evaluated page specification program by executing the modified version of the page specification program, wherein executing the modified version of the page specification program executes the first part of the page specification program and outputs the source code representation of the second part of the page specification program; and
enabling, at the request time, a display of the page to a plurality of different users by executing the partially evaluated page specification.

12. The client of claim 11, wherein the page is at least one of a checkout page, a page associated with an online store, or a page that displays a virtual shopping cart.

13. The client of claim 11, wherein the interface is provided to a third-party entity.

14. The Client of claim 11, wherein the client is operative with at least one of a mobile device or a wired computing device.

15. A system for providing a page for display over a network at a request time, comprising:
a first device for specifying, during a design time, a customization of the page by way of an interface provided by a second device, wherein the page is generated by executing a page specification program; and
the second device, wherein the second device is coupled to the first device, and wherein the second device is configured to perform actions, including:
determining, during the design time, a first part of the page specification program capable of being evaluated to a static form based on the customization and a second part of the page specification program to be evaluated at the request time;
generating, during the design time, a modified version of the page specification program by converting the second part of the page specification program to a form that, when executed, outputs a source code representation of the second part of the page specification program;
generating, during the design time, a partially evaluated page specification program by executing the modified version of the page specification program, wherein executing the modified version of the page specification program executes the first part of the page specification program and outputs the source code representation of the second part of the page specification program; and
enabling, at the request time, a display of the page to a plurality of different users by executing the partially evaluated page specification program.

16. The System of claim 15, wherein the first device is at least one of a mobile device or a wired computing device.

17. A storage device having processor-executable code thereon that if executed by a processor performs actions to provide a page for display over a network at a request time, comprising:

providing an interface enabling a page designer, during a design time, to customize the page, wherein the page is generated by executing a page specification program;

determining, during the design time, a first part of the page specification program capable of being evaluated to a static form based on the customization and a second part of the page specification program to be evaluated at the request time;

generating during the design time, a modified version of the page specification program by converting the second part of the page specification program to a form that, when executed, outputs a source code representation of the second part of the page specification program;

generating, during the design time, a partially evaluated page specification program by executing the modified version of the page specification program, wherein executing the modified version of the page specification program executes the first part of the page specification program and outputs the source code representation of the second part of the page specification program; and enabling, at the request time, a display of the page to a plurality of different users by executing the partially evaluated page specification program.

\* \* \* \* \*